Figure 1:
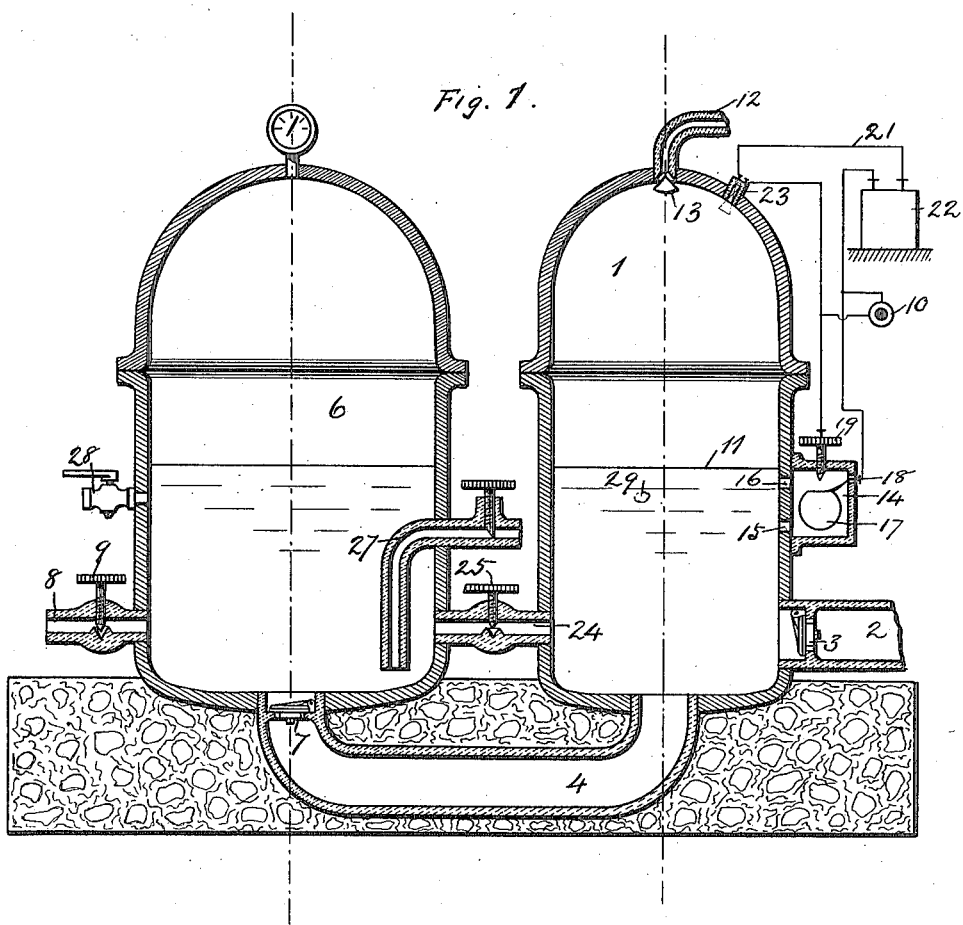

W. SCHAFER.
INTERNAL COMBUSTION PUMP.
APPLICATION FILED FEB. 12, 1914.

1,158,303.

Patented Oct. 26, 1915.
2 SHEETS—SHEET 1.

WITNESSES:

INVENTOR,
William Schafer,
BY Francis M. Wright,
ATTORNEYS.

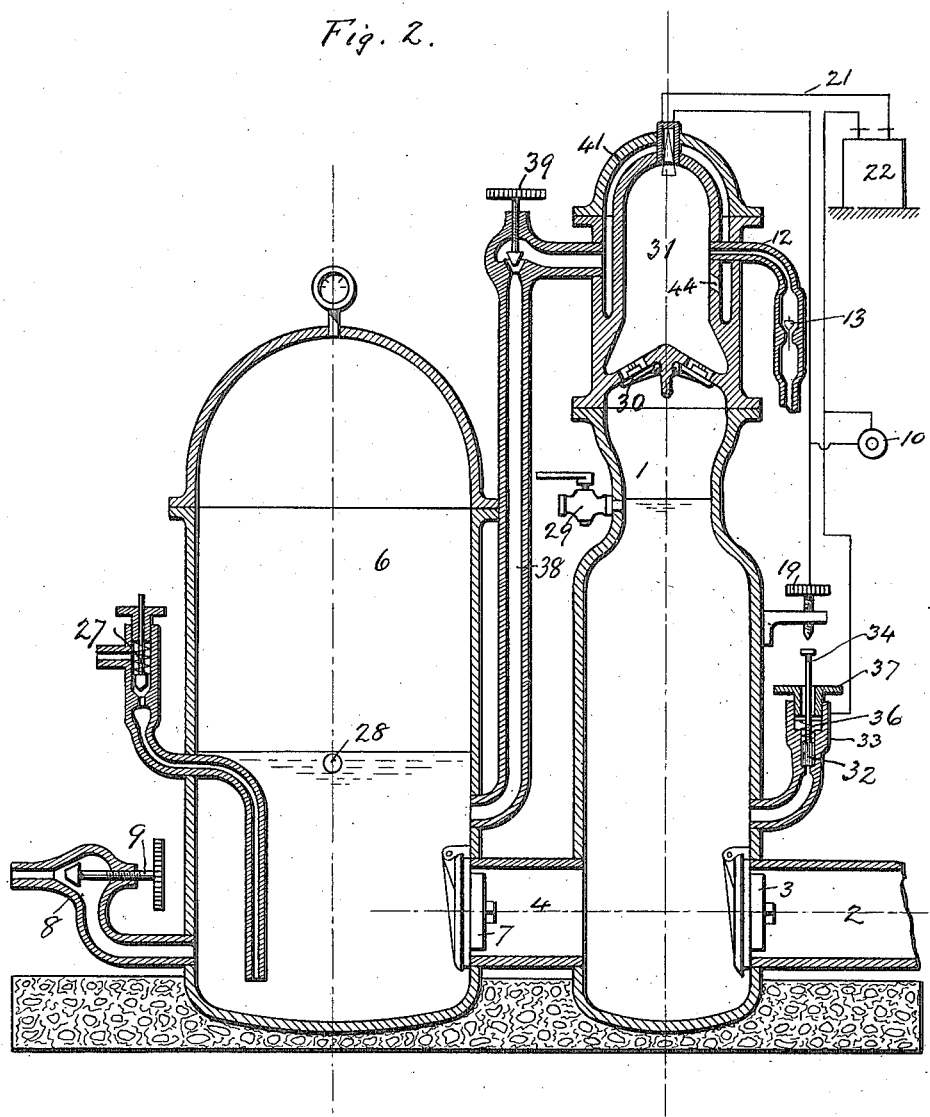

UNITED STATES PATENT OFFICE.

WILLIAM SCHAFER, OF SAN FRANCISCO, CALIFORNIA.

INTERNAL-COMBUSTION PUMP.

1,158,303.  Specification of Letters Patent.  Patented Oct. 26, 1915.

Application filed February 12, 1914. Serial No. 818,260.

*To all whom it may concern:*

Be it known that I, WILLIAM SCHAFER, a subject of the Emperor of Germany, residing at San Francisco, in the county of San Francisco and State of California, have invented new and useful Improvements in Internal-Combustion Pumps, of which the following is a specification.

The present invention relates to an improved pump by which power generated by the combustion of a combustible gas or other substance can be utilized to propel a liquid economically and with great force so that the liquid can be used either directly or to operate a turbine or an engine of any other suitable character.

In the accompanying drawings, Figure 1 is a vertical sectional view of one form of my improved pump; Fig. 2 is a similar view of another form thereof.

Referring to the drawings, 1 indicates a water supply and combustion chamber, of which the upper part is approximately hemispherical and the lower part cylindrical. Into said chamber water can flow by an inlet pipe 2 controlled by a check valve 3. A pipe 4 leads from the bottom of said chamber to the bottom of a similar chamber 6, said pipe being controlled by a check valve 7. From said chamber 6 leads an outlet pipe 8, the opening in which is controlled by a valve 9. Cocks 28, 29 are provided to permit the escape of air from the chambers 6 and 1 respectively, and, these cocks being open, water is admitted to the chamber 1 by the conduit 2 and flows from said chamber 1 by the conduit 4 into the chamber 6, and comes to the same level 11 in both chambers. Said cocks 28 and 29 are then closed. The combustible mixture is then, by a hand pump, (not shown), for the first combustion, forced into the upper portion of the chamber 1 by a pipe 12 controlled by a check valve 13. Said combustible mixture is then ignited by a push button 10 closing an electric circuit 21 through a generator 22 and a spark plug 23 projecting into the chamber 1. The ignited gases, being greatly expanded, force the water in the chamber 1, and through and out of the pipe 4, and into the chamber 6. Immediately thereupon a vacuum is formed in the chamber 1, causing water to flow through the pipe 2 and past the check valve 3 and at the same time the combustible mixture to flow through the pipe 12 and check valve 13.

The level of the water in the chamber 1 will be higher than that caused by the head of water flowing through the pipe 2, because the chambers 1 and 6 are connected by a pipe 24, the size of which is controlled by a valve 25, causing the pressure in the chamber 1 to be raised until it is equal to that in the chamber 6, so that the water stands at the same level in both. This level is arranged to be such that the water in a float chamber 14, connecting with the main chamber by upper and lower ports 15, 16, raises a float 17 in said float chamber and makes contact between a binding screw 18, electrically connected to the float, and an adjustable screw 19, and thereby completes said circuit 21, so that ignition takes place of the combustible mixture, which now only partly fills the upper portion, not occupied with water, of the chamber 1, the remainder of said upper portion being occupied with the waste gases of the previous combustion, now greatly reduced in volume. A second combustion then takes place of the combustible mixture, and the waste gases of the previous combustion are partly forced into the water, and partly driven into the chamber 6 together with the water and some of the waste gases of the second combustion. The pressure in the chamber 6 is regulated by the adjusting valve 9, which regulates the size of the opening in the pipe 8. The connection 24 between the two chambers 1 and 6 is important, because it permits of the combustible mixture being greatly compressed before ignition, thus greatly increasing the efficiency of the apparatus. The operation is then repeated indefinitely and automatically, so long as the water and combustible mixture are supplied, there being practically no movable parts 27 indicates a pipe having a valve therein which can be opened to reduce the pressure when excessive.

In the modification shown in Fig. 2, a combustion chamber 31 is secured upon the top of the water supply chamber 1, the bottom of said combustion chamber 31 having therein upwardly closing spring-controlled check valves 30. Instead of the float 17, there is now employed a piston 32, sliding vertically in a cylindrical guide 33 and carrying a contact maker 34 adapted to contact with the screw 19, a spring 36, compressed between said piston and a gland-shaped guide 37 screwed into said casing 33, resisting the upward motion of said piston. By screwing in more or less said guide 37 the pressure of said spring, and therefore the resistance offered by the piston to its upward movement, can be varied as desired, and therefore also there can be varied the pressure of water in the chamber 1. With this pressure varies the pressure in the chamber 6, for a pipe 38 controlled by a valve 39 leads from said chamber 6 into a water jacket 41 around the combustion chamber 31, said water jacket being connected with said combustion chamber through a small port 44 in its wall. Since the valves 30 open downwardly the pressure in the chamber 1 can never, except momentarily, be less than the pressure in the chamber 6. The operation of this form of the invention is slightly different from that of the form first described. The function of the valves 30 is to exclude by far the larger part of the expanded products of combustion from the combustion chamber 31. We will suppose, for instance, that the combustible mixture in the chamber 31 expands to ten times its volume by the heat of combustion. Then it is evident that only one-tenth of the waste gases will remain in said chamber 31 after combustion, and after the time when the pressure in the chamber 1 becomes greater than the pressure in the chamber 31, the remaining nine-tenths being unable to return to the chamber 31. Consequently only one-tenth of the waste gases will be in said chamber 31 when the combustible mixture is admitted thereto, and said combustible mixture can thus occupy nine-tenths of said chamber. The form of the invention shown in Fig. 1 is therefore best adapted for use with hydrogen or other combustible material in which the proportion of hydrogen is very great, while the form of the invention shown in Fig. 2 is adapted for hydrocarbonaceous gases, in which there is a larger proportion of carbon.

I claim:—

1. An explosion pump having explosion and pressure chambers, a main conduit from the explosion to the pressure chamber, a non-return valve therein, a restricted return conduit therebetween and means for igniting each new charge, means, dependent on the pressure in the explosion chamber, for rendering said igniting means operative, the discharge opening from the pressure chamber being less than the opening thereinto of the main conduit.

2. An explosion pump having explosion and pressure chambers, a main conduit from the explosion to the pressure chamber, a non-return valve therein, a restricted return conduit therebetween, means for igniting each new charge, means, dependent on the pressure in the explosion chamber, for rendering said igniting means operative, and means for variably restricting the size of the discharge opening from the pressure chamber.

3. An explosion pump having explosion and pressure chambers, a main conduit from the explosion to the pressure chamber, a non-return valve therein, a continuously open restricted return conduit therebetween, means for igniting each new charge, and means, dependent on the pressure in the explosion chamber, for rendering said igniting means operative, the discharge opening from the pressure chamber being less than the opening thereinto of the main conduit.

4. An explosion pump having explosion and pressure chambers, a main conduit from the explosion to the pressure chamber, a non-return valve therein, a restricted return conduit therebetween, means for varying the capacity of said conduit, means for igniting each new charge, and means, dependent on the pressure in the explosion chamber, for rendering said igniting means operative, the discharge opening from the pressure chamber being less than the opening thereinto of the main conduit.

5. In an apparatus of the character described, the combination of a chamber, a partition dividing said chamber, an upwardly closing non-return valve in said partition, a water jacket surrounding said upper portion, an ignition device in the upper portion thereof, a conduit for conducting a combustible mixture into the upper portion thereof, a liquid inlet conduit entering the lower portion thereof, a non-return valve in said water conduit, a pressure equalizing chamber, a discharge outlet therefrom, a conduit connecting the lower portion of the first-named chamber with said pressure equalizing chamber, a conduit having a contracted passage therethrough and connecting the two chambers through said water jacket, and means actuated by the rise of the liquid in said first-named chamber for actuating said igniting device.

In testimony whereof I have hereunto set my hand in the presence of two subscribing witnesses.

WILLIAM SCHAFER.

Witnesses:
FRANCIS M. WRIGHT,
D. B. RICHARDS.

Copies of this patent may be obtained for five cents each, by addressing the "Commissioner of Patents, Washington, D. C."